Aug. 23, 1955 W. A. JOHNSON ET AL 2,715,956
APPARATUS FOR MANUFACTURING POTTERY WARE
Original Filed Feb. 24, 1950 8 Sheets-Sheet 1

INVENTOR.
WALTER A. JOHNSON
+ NORMAN I. SEBELL
BY
*T. Emmett Thompson*
ATTORNEY

Aug. 23, 1955  W. A. JOHNSON ET AL  2,715,956
APPARATUS FOR MANUFACTURING POTTERY WARE
Original Filed Feb. 24, 1950  8 Sheets-Sheet 8

INVENTOR.
WALTER A. JOHNSON
+ NORMAN I. SEBELL
BY Emmett Thompson
ATTORNEY

United States Patent Office 2,715,956
Patented Aug. 23, 1955

2,715,956

APPARATUS FOR MANUFACTURING POTTERY WARE

Walter A. Johnson, Syracuse, N. Y., and Norman I. Sebell, Long Meadow, Mass., assignors to Onondaga Pottery Company, Syracuse, N. Y., a corporation of New York Original application February 24, 1950, Serial No. 146,054, now Patent No. 2,686,587, dated August 17, 1954. Divided and this application May 19, 1952, Serial No. 288,606

7 Claims. (Cl. 198—25)

This invention relates to the manufacture of pottery ware, and has as an object apparatus embodying a particularly compact structure of simple arrangement which functions to automatically jigger pieces of ware on an advancing procession of moulds.

The invention consists in the novel features and in the combinations and constructions hereinafter set forth and claimed.

In describing this invention, reference is had to the accompanying drawing in which like characters designate corresponding parts in all the views.

This application is a divisional application of our copending application, Serial Number 146,054, filed February 24, 1950 now Patent No. 2,686,587.

Figure 3:
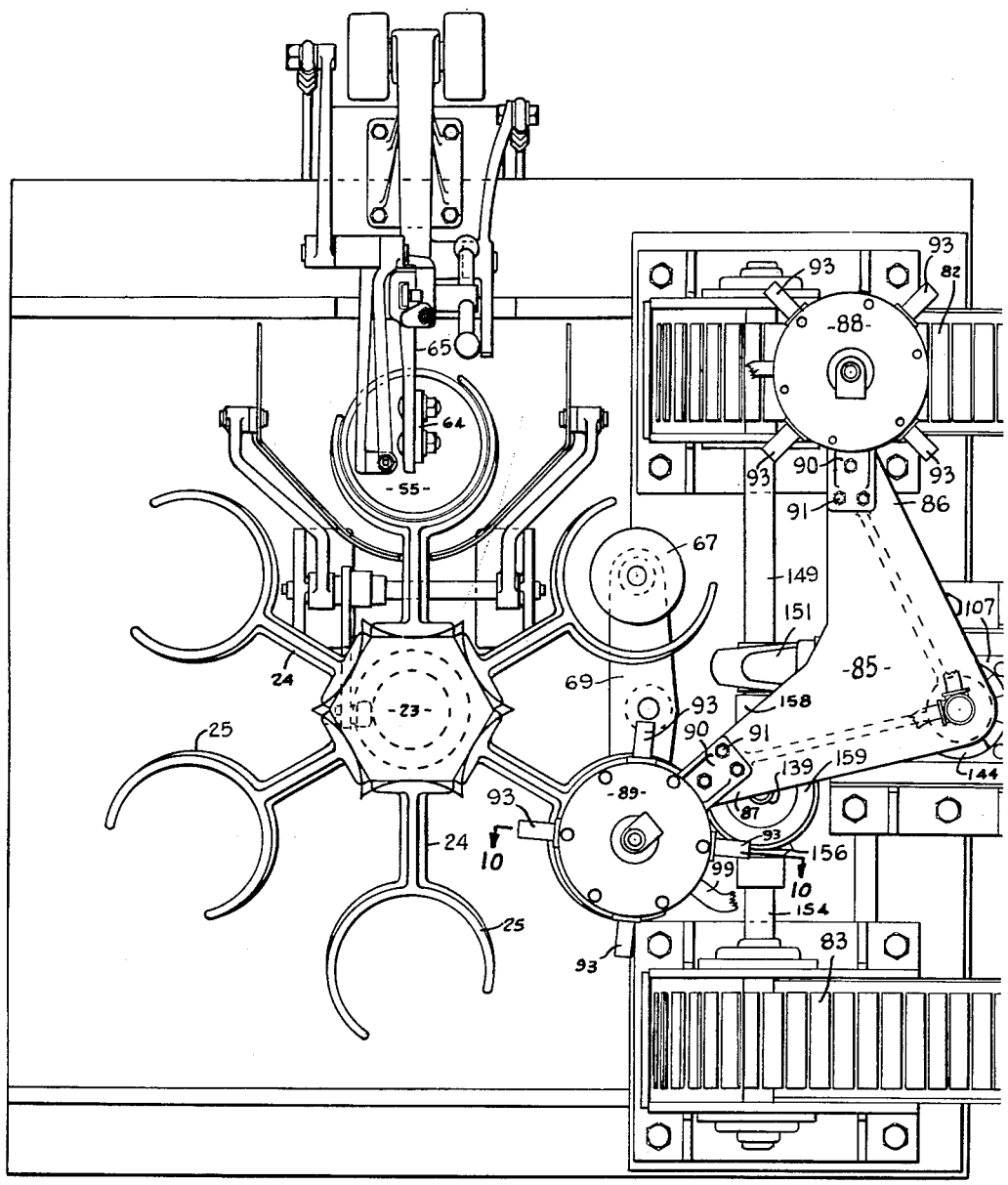
Figure 3 is an enlarged top plan view of the ware forming apparatus shown in the left hand end portion of Figures 1 and 2.
Figure 4:
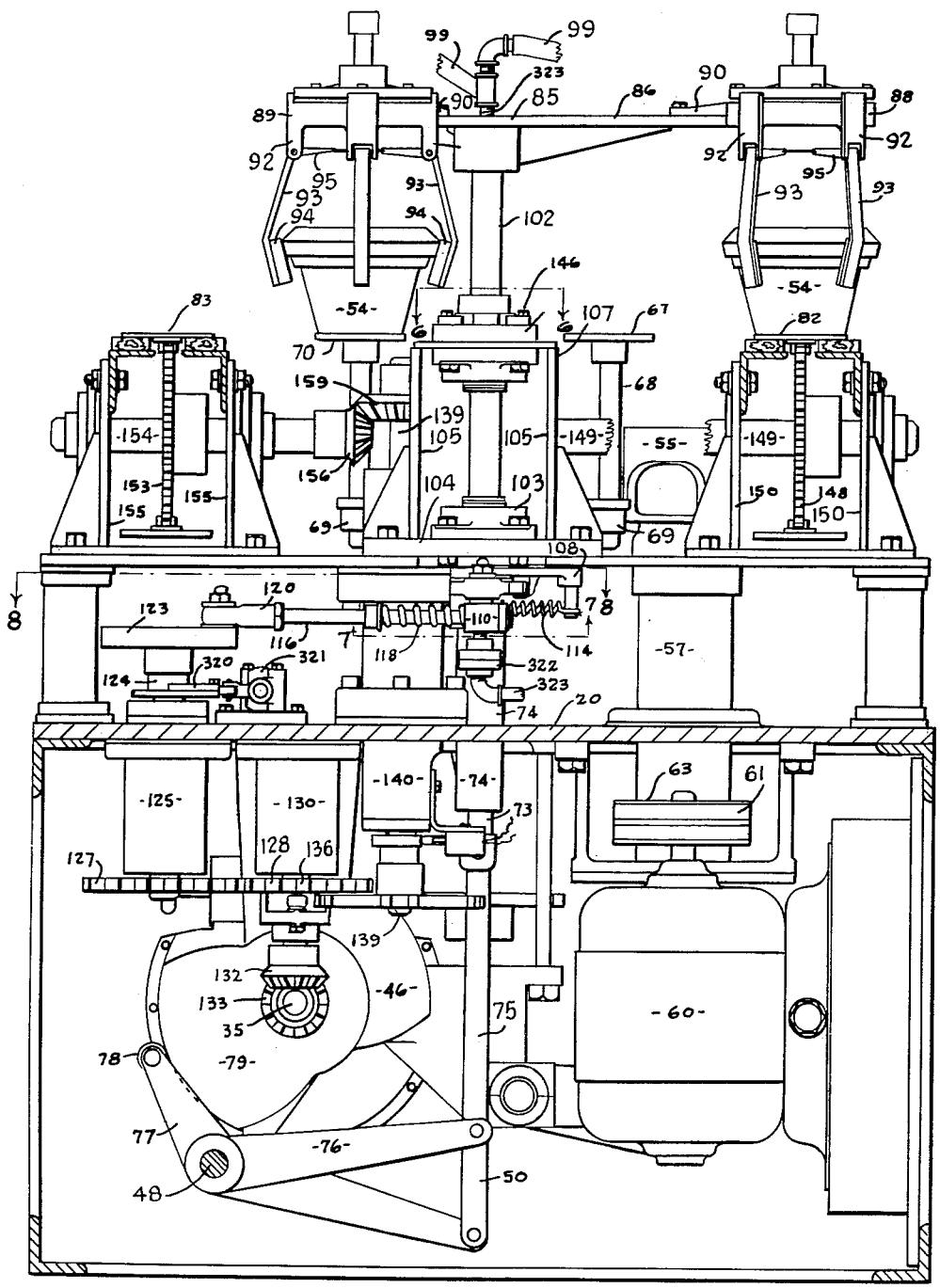
Figure 4 is an enlarged front elevational view partly in section of the left hand portion of the structure shown in Figure 1.
Figure 5:
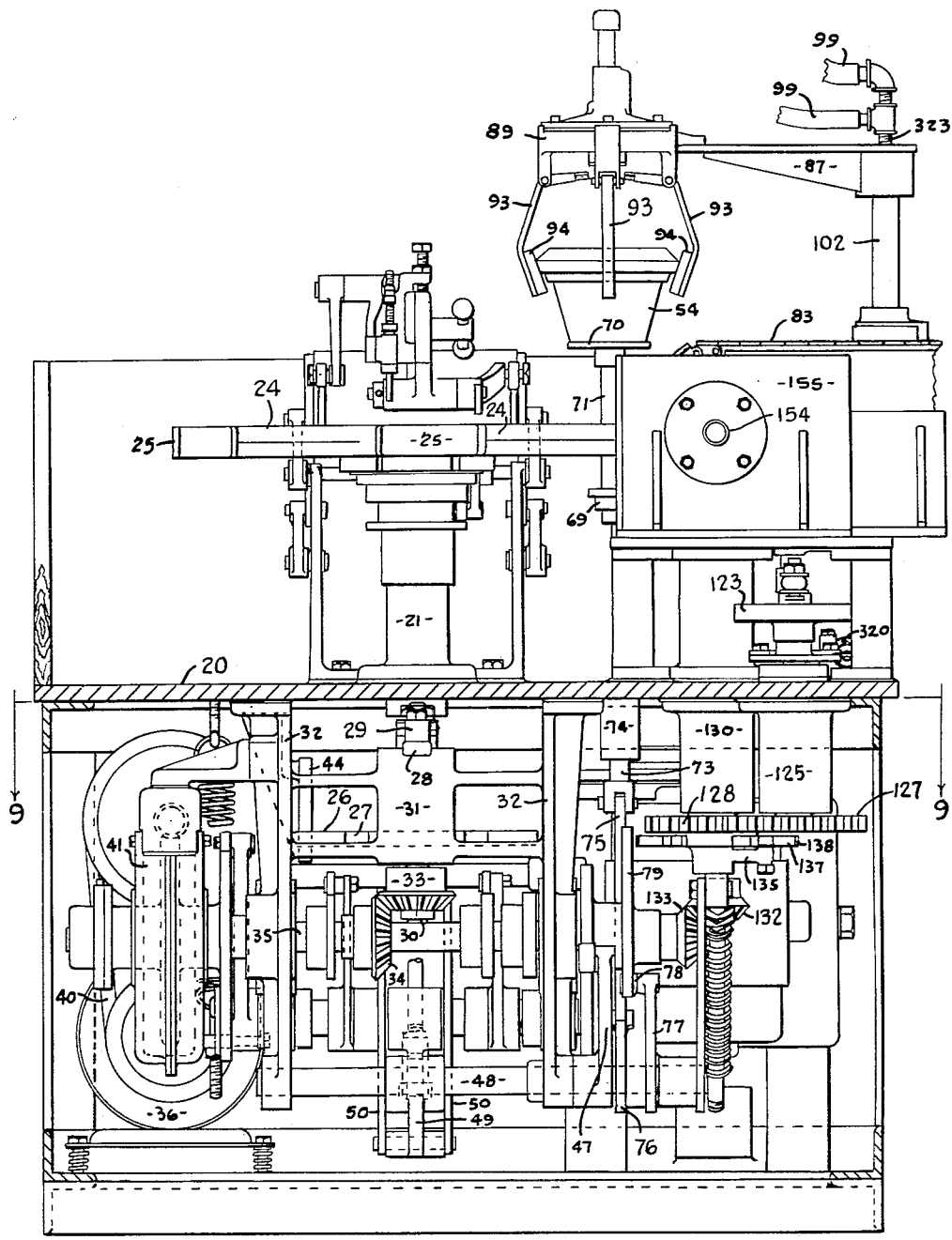
Figure 5 is an enlarged elevational view with parts in section of the structure shown in Figure 4 looking to the left.
Figure 6:
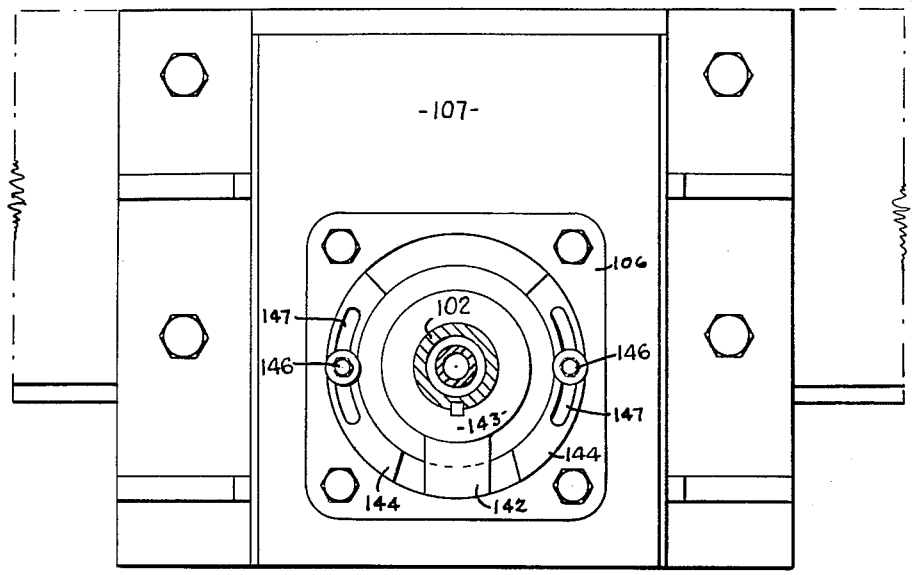
Figure 7:
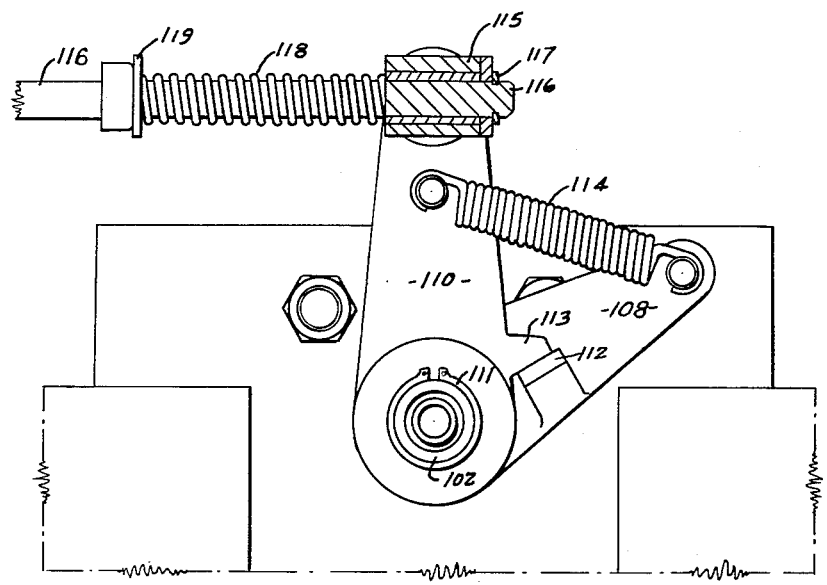
Figure 8:
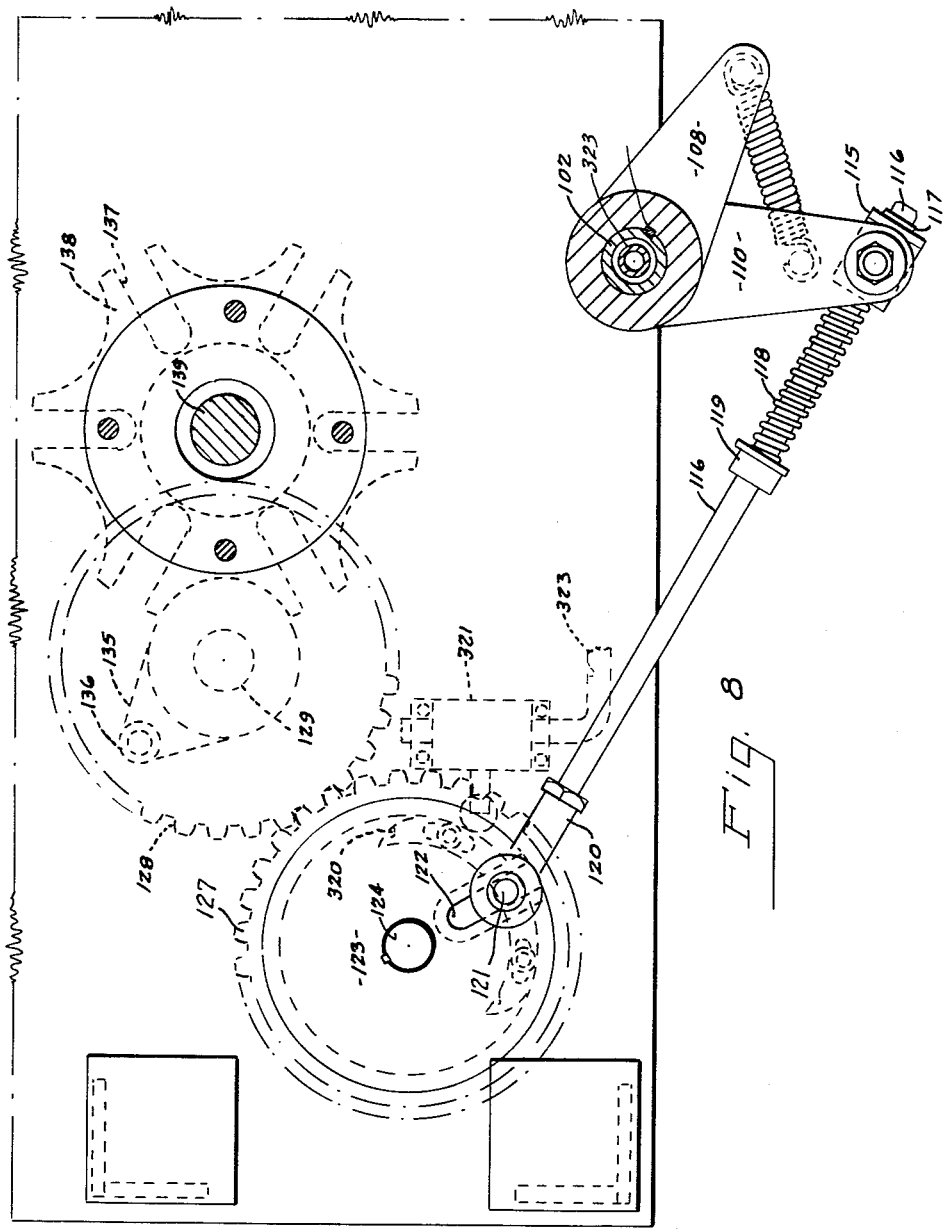
Figure 9:
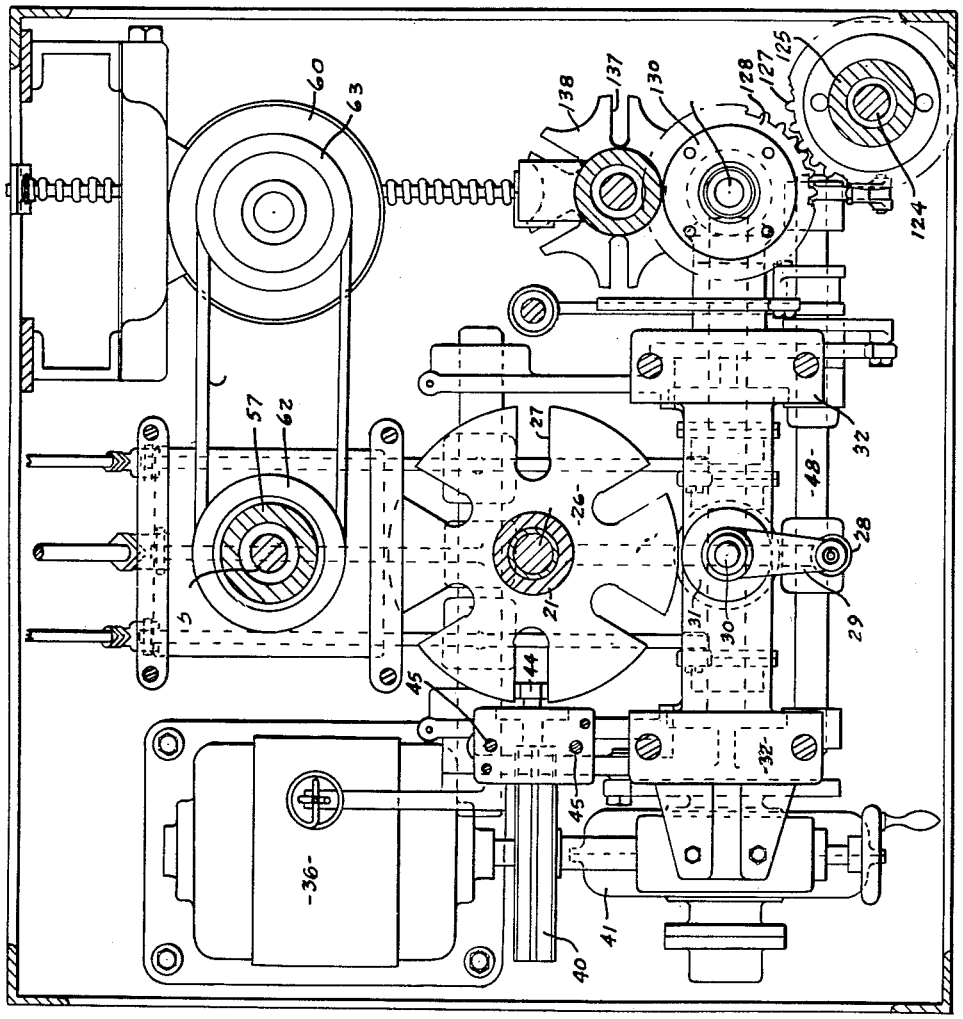

Figure 6 is a view taken on line 6—6, Figure 4.
Figure 7 is a view taken on line 7—7, Figure 4.
Figure 8 is a view taken on line 8—8, Figure 4.
Figure 9 is a view taken on line 9—9, Figure 5.
Figure 10 is a sectional view on line 10—10, Figure 3.

The ware forming apparatus is of the turret type wherein the moulds in which, or on which, the ware is formed are advanced to and from the jigger spindle by a turret mould carrier. The moulds are advanced in a continuous procession by conveyor and transfer mechanism to the mould carrying turret which moves the moulds to and deposits the same on the jigger spindle which effects rotation of the moulds while the ware forming tool is moved into engagement with the clay to form the ware. The moulds are then removed from the jigger spindle by the turret and transferred by the transfer mechanism to a second conveyor.

Figure 1:
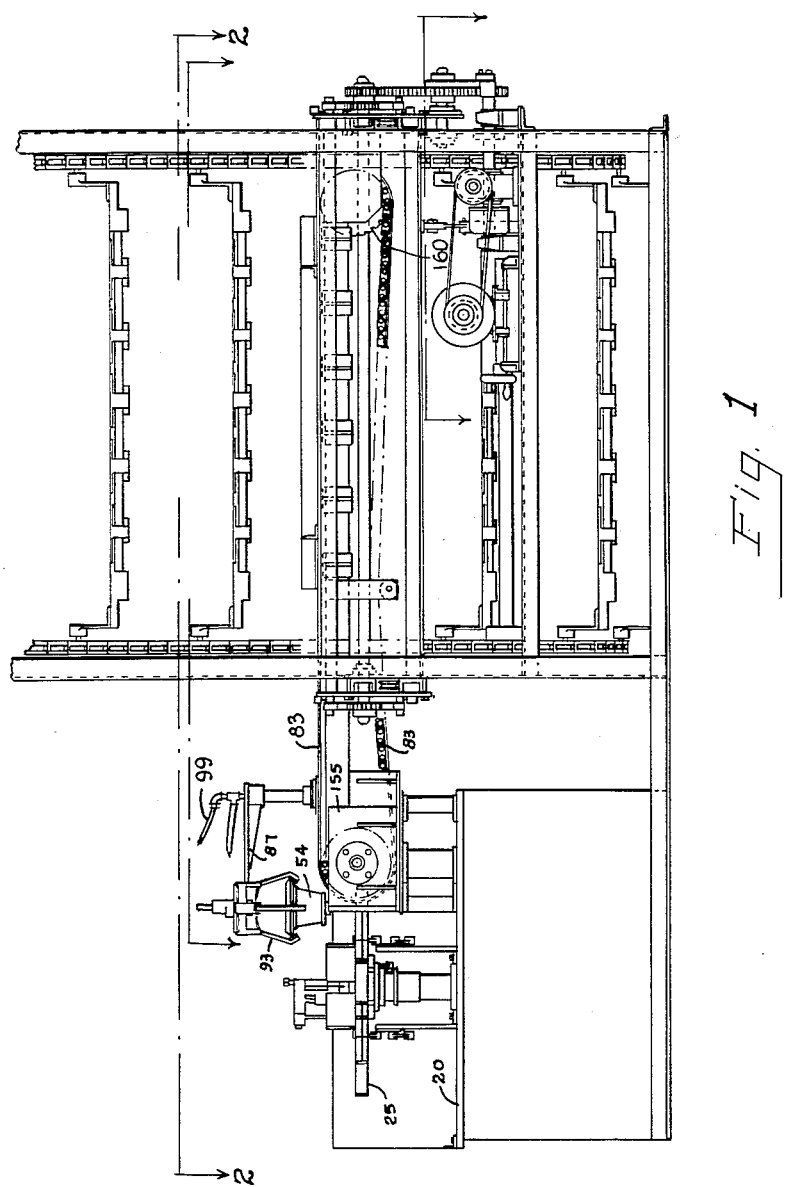
Figure 1 is a front elevational view of ware forming apparatus embodying our invention.
Figure 2:
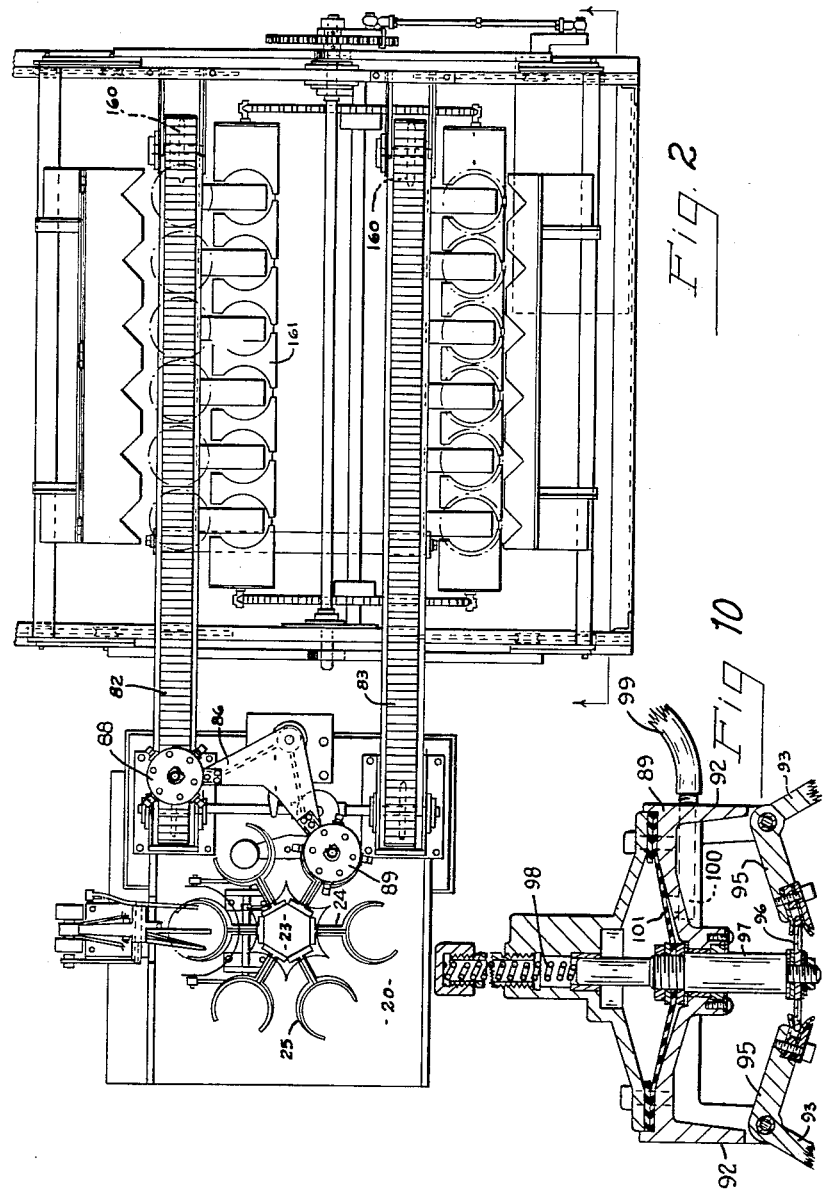
Figure 2 is a view taken on line 2—2, Figure 1.

The actuating or drive mechanism of the forming apparatus is enclosed in a cabinet having a flat top wall 20. A spindle support 21 is mounted centrally on the top 20, and a spindle 22 is journalled vertically in the support 21 and has affixed to its upper end the mould carrying turret 23 which is formed with radially extending arms 24 terminating at their outer ends in circular mould supports 25. These supports are open at one side, as shown in Figures 2 and 3. The turret is indexed or rotated intermittently by a Geneva disk 26, Figure 9, formed with slots 27 to receive a roller 28 carried on the free end of a crank arm 29, see Figures 5 and 9. The crank arm 29 is affixed to the upper end of a shaft 30 journalled vertically in a hub portion 31 of a bracket having side arms 32 affixed to the under side of the top plate 20 and depending therefrom. A beveled gear 33 is affixed to the lower end of the shaft 30 and is arranged in mesh with a similar gear 34 fixed to a shaft 35 extending horizontally and journalled in the depending arms 32 of the supporting bracket. The shaft 35 is rotated by a motor 36 mounted in the cabinet, the drive being effected by a transmission belt 40 connecting the motor to a gear reducing unit 41, the output shaft of which is connected to the main shaft 35, see Figures 5 and 9.

The turret shaft 22 is arranged for vertical movement in the bearing support 21 and during the ware forming operation the Geneva 26 is positioned below the path traveled by the crank roller 28, see Figure 5, and is locked against rotation by a gib member 44 fixedly secured to the top plate 20, as by screws 45, Figure 9, the arrangement being such that at the end of an indexing operation one of the Geneva slots 27 is positioned in registration with the gib. Previous to the indexing operation, the shaft 22 and the turret carried thereby are elevated to move the Geneva 26 out of locking engagement with the gib 44 and to position the Geneva for engagement by the crank roller 28.

Vertical reciprocation of the turret is effected by a cam 46 mounted on the shaft 35 and which actuates an arm 47 fixed to a shaft 48 journalled in the lower ends of the depending side arms 32. An arm 49 is affixed centrally on the shaft 48 and extends inwardly and is connected at its inner end to a pair of links 50, the upper ends of which are connected to the lower end of the turret shaft 22 by means of a rotatable coupling not shown.

The moulds 54 are positioned in a chuck 55 for rotation during the forming operation. The chuck 55 is fixed to the upper end of a spindle 56, Figure 9, journalled vertically in a supporting member 57 extending upwardly and downwardly from the top plate 20, Figure 4. The spindle is rotated by a motor 60 through belts 61 trained over a pulley 62 affixed to the lower end of the spindle 56 and a pulley 63 affixed to the motor shaft.

The arrangement is such that the turret is indexed to position one of the mould carriers 25 in registration with the chuck 55, at which time the turret is lowered by cam 46, as previously described, whereupon the mould is deposited in the chuck. The chuck and mould are then rotated by the motor 60 and a forming tool 64 fixed to an arm 65, Figure 3, is lowered into contact with the clay carried by the mould and the clay formed into a piece of ware. The arm 65 is actuated in timed relation by additional cams mounted on shaft 35. At the completion of the forming operation, the arm 65 and tool is raised and the turret is elevated by the cam 46, raising the mould out of the chuck, and the turret is then indexed to position the mould in registration with a pad or mould support 67. This pad is supported by a stem 68, see Figure 4, extending upwardly from one end of a cross member 69, see Figure 3. A similar pad 70 is carried by a stem 71 extending upwardly from the opposite end of the cross member 69. The cross member is mounted intermediate its ends on a stem 73 mounted for vertical movement in a supporting member 74, Figures 4 and 5, secured to the top plate 20. The lower end of the stem 73 is connected to a link 75, the lower end of the link being connected to an arm 76 formed integral with an arm 77 having a roller 78 engaging the periphery of a cam 79 mounted on shaft 35, the arms 76, 77, forming an angle lever rotatably mounted upon the shaft 48, see Figures 4 and 5. The cam functions to effect vertical reciprocation of the mould supporting pads 67, 70. The pads 67, 70 are arranged or spaced in registration with the mould carriers 25 during the dwell period of the turret, at which time one of the mould carriers is alined with the chuck 55. When the mould carrying members 25 of the turret are positioned in registration with the pads 67, 70, the pads are elevated by the cam 79, and the mould with the formed ware therein is removed from the turret by the pad 67. These moulds, with the formed ware therein, are advanced successively from the pad 67 by a ware transfer mechanism and a conveyor 82. The moulds, with the formed ware thereon, are conveyed through a drier and the conveyor 82 may extend in juxtaposition to the drier conveyor, as illustrated in Figure 2. After the ware has been dried and removed from the moulds, the moulds are placed upon a conveyor 83 which advances the moulds toward the pad 70. During each dwell period of the turret, the pads 67—70 are elevated and lowered by the cam 79. When the pad 70 moves downwardly, it deposits an empty mould in the carrier 25 positioned in registration with the pad. In the apparatus here shown the mould, with the formed ware therein positioned on pad 67, is transferred to the out-feed conveyor 82, and an empty mould is transferred from the in-feed conveyor 83 to the pad 70. The pads are then lowered, whereupon the empty mould is deposited in the carrier 25. The turret is indexed successively by the Geneva 26 and at one of the positions between the pad 70 and the mould chuck 55, a quantity of plastic clay is placed in or on the mould. The jigger, or ware forming machine, is more fully described in the copending application of Arthur J. Briggs, Serial No. 111,032, filed August 18, 1949, also owned by the assignee of this application.

The moulds are transferred from the pad 67 and to the pad 70, by a transfer member comprising a cross member support 85 having arms 86, 87, Figure 3. On the end of each of the arms 86, 87, there is mounted circular shaped members 88, 89, respectively. These members are provided with brackets 90 affixed to the arms 86, 87, as by screws 91. Each of the members 88, 89, are formed with four depending portions 92, Figures 4 and 10, to the lower ends of which are pivotally mounted fingers 93 provided with blocks 94 of resilient material at the lower ends. The fingers 93 have inwardly extending projections 95 which coact with a disk member 96 carried on a stem 97 mounted for vertical movement in the members 88, 89; the vertical movement being effected in a downward direction by a compression spring 98, and in an upward direction by the application of compressed air through a hose 99 connected to a supply pipe 100 on the under side of a diaphragm 101, see Figure 10. Upon the application of air under pressure to the heads 88, 89, the lower ends of the fingers 93 are caused to move radially inwardly to grip the rim portion of the mould 54 with sufficient pressure to transfer the mould upon oscillation of the support 85.

The support 85 is affixed to the upper end of a tubular shaft 102 journalled vertically in a bearing 103 mounted on the bottom plate 104 of a boxlike structure having side members 105, Figure 4. The upper portion of the shaft is journalled in a bearing 106 mounted on a plate 107 fixed on the side walls 105. The shaft 102 has affixed to its lower end an arm 108, as by key 109, Figures 7 and 8, and directly below the arm 108, an arm 110 is journalled upon the shaft and is retained against downward movement by a snap ring 111 positioned in a groove in the shaft. The arms 108, 110, are formed with coacting stop projections 112, 113, respectively. The arms are yieldingly urged together with the stops 112, 113, in engagement by helical tension spring 114, see Figure 7.

A head 115 is pivotally secured to the arm 110 and is apertured to slidably receive a link 116 provided at its end with a fixed collar 117 abutting against one end of the head member 115, and the opposite end of the head member is engaged by a helical compression spring 118, the opposite end of which abuts against a fixed collar 119. The opposite end of the link 116, Figure 8, is provided with a head 120 apertured to receive a crank pin 121 adjustably mounted in a slot 122 formed in a crank disk 123 affixed to the upper end of a shaft 124. The shaft 124 is journalled vertically in a bearing member 125 carried by the top plate 20 and is provided on its lower end with a spur gear 127 arranged in mesh with a similar gear 128. The gear 128 is secured on a shaft 129, see Figure 9, which is journalled vertically in a bearing support 130 depending from the top plate 20, see Figure 4. The shaft 129 has affixed to its lower end a miter gear 132 arranged in mesh with a similar gear 133 mounted on the end of the main cam shaft 35, see Figures 4 and 5. Directly above the gear 132, a crank arm 135 is fixed to the shaft and has a roller 136 which is movable into and out of slots 137, see Figure 8, in a Geneva disk 138. The Geneva 138 is affixed to the lower end of a shaft 139 journalled vertically in a bearing housing 140 depending from and extending above the top plate 20, Figure 4.

Rotation is imparted to the shaft 124 by shaft 129 and meshing gears 127 and 128, effecting reciprocation of the link 116 and oscillation of the tubular shaft 102 on which the mould transfer members are mounted. The oscillatory movement of the transfer member 85 is controlled by a radial projection 142 on a hub member 143 affixed to the shaft 102, see Figure 6. This radial projection 142 is arranged to engage arcuate shaped stop members 144 mounted upon the upper bearing member 106, as by screws 146, extending through arcuate slots 147 in each of the members 144 to provide for circumferential adjustment of the members. The springs 114, 118, Figure 7, permit over-run of the link 116 in both directions after the projection 142 engages the adjustable stops 144.

The conveyor 82 is in the form of an endless belt movable over a driving sprocket 148 mounted upon a shaft 149 journalled in a boxlike structure having vertical side members 150 and also journalled in a bearing bracket 151, Figure 3, attached to the front wall of the boxlike structure carrying the bearings 103, 106, for the transfer shaft 102.

The conveyor 83 is of similar construction being driven by a sprocket 153 mounted on a shaft 154 journalled in another boxlike structure having side walls 155. This shaft has affixed to its inner end a bevel gear 156, and the shaft 149 has a similar gear 158; these gears meshing with a gear 159 affixed to the upper end of the shaft 139. By this arrangement, intermittent movement is imparted to the conveyors 82, 83, by means of the Geneva 138, the conveyor 82 moving away from the jigger and the conveyor 83 moving toward the jigger.

The endless conveyor chains 82, 83, are trained over additional sprockets 160 journalled in suitable supporting framework, as shown in Figure 2. The conveyors 82, 83, may extend in direct juxtaposition to an oven drier conveyor provided with shelves 161 arranged on an endless conveyor chain operable to move the shelves in juxtaposition to the conveyors 82, 83, the specific arrangement of such structure being disclosed in our parent copending application, Serial No. 146,054.

In operation, a quantity of plastic clay is placed in or on each empty mould carried by the mould supports 25. The turret is intermittently indexed and as each mould with the plastic clay therein is deposited into the mould chuck 55 by downward movement of the turret, the clay is formed into a piece of ware. The mould, with the formed ware therein, is removed from the chuck upon upward movement of the turret and in the next indexing operation, the mould is positioned in registration with the pad 67. On downward movement of the turret and upward movement of the pad 67, the mould is removed from the carrier 25 and positioned on a plane with the conveyor 82. During this operation, the transfer member 85 has moved in a counter-clockwise direction, Figure 3, so that when the pad 67 has elevated the mould with the ware thereon, the fingers 93 will encircle the mould. At this time, a cam 320 adjustably mounted on shaft 124 opens the air valve 321, Figures 4 and 8, supplying air under pressure to the pipe 323 extending upwardly through the spindle 102. This pipe at its lower end is provided with a swivel union 322 and is connected at its upper end to the hose 99. With the compressed air supplied to the under side of the diaphragm 101, the fingers 93 are moved inwardly gripping the brim of the mould. Thereupon, the transfer member 85 is moved in a clockwise direction, positioning the mould on the carrier 82 and by this operation an empty mould is transferred from the conveyor 83 to the pad 70. At the end of this clockwise movement, cam 320 functions to open the valve 321 connecting the pipe 323 to atmosphere, whereupon the spring 98 moves the stem 97 downwardly and moves the fingers 93 outwardly to disengage the moulds.

It will be apparent from the description thus far that moulds with formed ware therein are successively deposited upon the pad 67 and transferred therefrom to the outgoing conveyor 82 and simultaneously, empty moulds are transferred from the incoming conveyor 83 and deposited upon the pad 70 to be picked up by the turret mould carriers 25. In other words, the jigger or forming machine is automatically supplied with empty moulds, and filled moulds with formed ware therein, or thereon, are removed from the jigger.

What we claim is:

1. Apparatus for handling pottery ware moulds comprising a frame, an empty mould support, a filled mould support, a mould turret having a plurality of circumferentially spaced mould pockets, means intermittently indexing said turret and causing the same to dwell with a pocket positioned in registration with each mould support, means operable to effect relative vertical movement between said supports and the turret, and said supports and turret being cooperable upon such relative movement to transfer a mould from the turret to the filled mould support and to transfer a mould from the empty mould support to the turret, an in-feed conveyor arranged in proximity to said empty mould support and operable in timed relation to said turret to advance a procession of moulds towards said support, an out-feed conveyor arranged in proximity to the filled mould support and operable in timed relation to the turret to advance a procession of moulds away from the filled mould support, a mould transfer member arranged contiguous to said conveyors and being operable in timed relation to said turret and conveyors to simultaneously move a mould from the filled mould support to the out-feed conveyor, and to move a mould from the in-feed conveyor to said empty mould support.

2. Apparatus for the manufacture of pottery ware comprising a frame, a mould carrying turret journalled on a vertical axis and having circumferentially spaced apart mould receiving pockets, a filled mould support, an empty mould support, said turret being operable upon indexing movement to advance moulds successively from the empty mould support and to the filled mould support, means for indexing said turret and causing the same to dwell with mould receiving sockets in registration with said supports, said supports being mounted for vertical reciprocation relative to the turret and being operable upon upward movement to remove a mould with ware therein from the turret and upon downward movement to deposit a mould on the turret, an out-feed conveyor, an in-feed conveyor, a ware transfer member operable upon upward movement of said supports to transfer a mould from the filled mould support to said out-feed conveyor, and to transfer an empty mould from said in-feed conveyor to said empty mould support, and motion transmitting mechanism operable to effect actuation of said conveyors and ware transfer member in timed relation to said turret and supports.

3. Apparatus for the manufacture of pottery ware comprising a frame, a pair of mould supports, an empty mould in-feed conveyor arranged in proximity to one support, a filled mould out-feed conveyor arranged in proximity to said other support, a mould turret rotatable about a vertical axis to advance moulds successively from said empty mould support and to said filled mould support, said mould supports being positioned contiguous to said turret, a mould transfer operable to transfer a filled mould from said filled mould support to said out-feed conveyor and simultaneously transfer an empty mould from said in-feed conveyor to said empty mould support, and actuating mechanism operable to actuate said turret, transfer, and conveyors in timed relation.

4. Apparatus for the manufacture of pottery ware, a mould carrying turret operable upon indexing movement to advance a procession of moulds, an in-feed conveyor, an out-feed conveyor, said conveyors being arranged horizontally in a plane above said turret, a pair of mould supports mounted for vertical reciprocation in unison and being operable upon upward movement to elevate a mould with ware therein from the turret to the plane of said conveyors, and upon downward movement to lower a mould into said turret, a ware transfer mechanism mounted in juxtaposition to said supports and said conveyors and being operable upon elevation of said supports to transfer the filled mould to the out-feed conveyor and to transfer an empty mould from the in-feed conveyor to the other support.

5. An apparatus for feeding empty moulds to an indexing turret mounted for horizontal movement and removing filled moulds therefrom, the combination of an empty mould conveyor operable to advance a procession of empty moulds toward said turret, a filled mould conveyor operable to advance a procession of filled moulds away from said turret, a vertically reciprocable double mould lifter operable upon upward movement to raise a filled mould out of said turret at one station and upon downward movement to lower an empty mould into said turret at the next succeeding station, a mould transfer unit operable to successively transfer filled moulds from said lifter to said filled mould conveyor, and to simultaneously transfer empty moulds from said other conveyor to the lifter, and motion transmitting mechanism operable to actuate said turret, lifter and conveyors in timed relation.

6. Apparatus for the manufacture of pottery ware comprising a frame, a moulding carrying turret journalled in the frame for rotation about a vertical axis, in-feed and out-feed mould conveyors, an empty mould support, a filled mould support, said supports being mounted in the frame for vertical movement intermediate said conveyors and turret, a shaft journalled vertically in the frame intermediate said conveyors and in proximity to said mould supports, a mould gripper support extending laterally from said shaft, a filled mould gripper and an empty mould gripper carried by said last mentioned support for movement into and out of registration with said mould supports and conveyors upon oscillation of said shaft, means operable to cause said filled mould gripper to grip a mould on said filled mould support and to release the mould upon transfer to said filled mould conveyor, said means being also operable to cause said empty mould gripper to grip an empty mould on the in-feed conveyor and to release the mould upon transfer to said empty mould support, means operable to intermittently index said turret to successively advance moulds from the empty mould support and to said filled mould support, and motion transmitting means operable to effect elevation of said mould supports and oscillation of said shaft in timed relation to the indexing movement of the turret.

7. Apparatus as defined in claim 6 wherein there is provided adjustable stop means cooperable to limit the extent of oscillation of said vertical shaft.

References Cited in the file of this patent
UNITED STATES PATENTS
805,876   O'Neill _____ Nov. 28, 1905